Fig.1.

United States Patent Office 2,706,830
Patented Apr. 26, 1955

2,706,830

MOLDING APPARATUS

Harry H. Holly, Chicago, Ill., assignor to Hollymatic Corporation, a corporation of Illinois Application April 25, 1952, Serial No. 284,355

7 Claims. (Cl. 17—32)

This invention relates to an apparatus for molding a plastic material such as ground meat to form articles such as meat patties.

One of the features of this invention is to provide such an apparatus having a hopper for the material and including a feed exit, a mold communicable therewith, a feeder in the hopper movable toward and away from the exit to force material from the hopper into the mold, operating apparatus, and linkage means operably attached to the operating apparatus and feeder for increasing the power exerted on the feeder when the feeder is in a position adjacent to the exit, the linkage means preferably including spring means capable of exerting a predetermined force on the feeder when the feeder is moved toward the hopper exit.

A further feature of the invention is the provision of a molding apparatus including a mold having a mold opening movable from a first position where the opening is in position to receive material to a second position where the material is removed from the opening in combination with a removing member that is carried by the mold and that is operable to remove the material from the mold opening when the mold has reached this second position.

Another feature of the invention is the provision of a molding apparatus including a movable mold plate having a mold opening and movable between the above specified positions in combination with a platform beneath the path of movement of the mold plate and adapted to contain a stack of separator sheets thereon, means for moving the topmost sheet forwardly into edge-projecting position and means for contacting this edge against the bottom of the mold plate adjacent to the leading edge of the opening while the mold is moving from the filling position to the discharge position so that this topmost separator sheet will be extended across and in contact with the bottom of the material while it is in the mold opening and also after it has been removed.

Other features and advantages of the invention will be apparent from the following description of certain embodiments of the invention taken in conjunction with the accompanying drawings. Of the drawings:

This invention has a number of important and useful features. One of the most important of these is that the apparatus is so constructed that it may be operated either by hand or by other sources of power. Furthermore, the construction of the apparatus is relatively simple yet it is so designed as to have a very large capacity and to be essentially trouble free in operation.

As can be seen in the drawings, the molding apparatus embodiment illustrated therein is adapted to rest on a base 10 such as a table and includes a lower casing 11 provided with a hopper 12. This hopper which is adapted to contain moldable material such as ground meat for making hamburger patties, sausage patties, fish patties and the like is provided with an upwardly flaring open top 12a, a flanged base 12b, and end reinforcing ribs 12d. The flanged base 12b is adapted to be removably attached to the top portion 11a of the casing 11 by front and rear winged bolts 13 and 14, respectively.

Located between the bottom 12b of the hopper 12 and the top 11a of the casing 11 is a substantially horizontal mold plate 15 having a mold opening 15a therein of circular, square or other desired shape. The mold plate is separated from the base 12b of the hopper by an auxiliary plate 16 that is provided with an exit opening 16a therein adapted to communicate with the mold opening 15a so that material may be fed therethrough from the hopper into the mold opening in the customary manner. As is shown most clearly in Figures 3, 4, 7 and 9, the mold plate 15 slides within the groove 17a of a second auxiliary plate 17 that rests on top of the casing 11. The provision of the second auxiliary plate 17 permits interchanging mold plates 15 of varying thicknesses and having different sized mold openings 15a so that a patty of a desired predetermined size may be produced.

Figure 4:
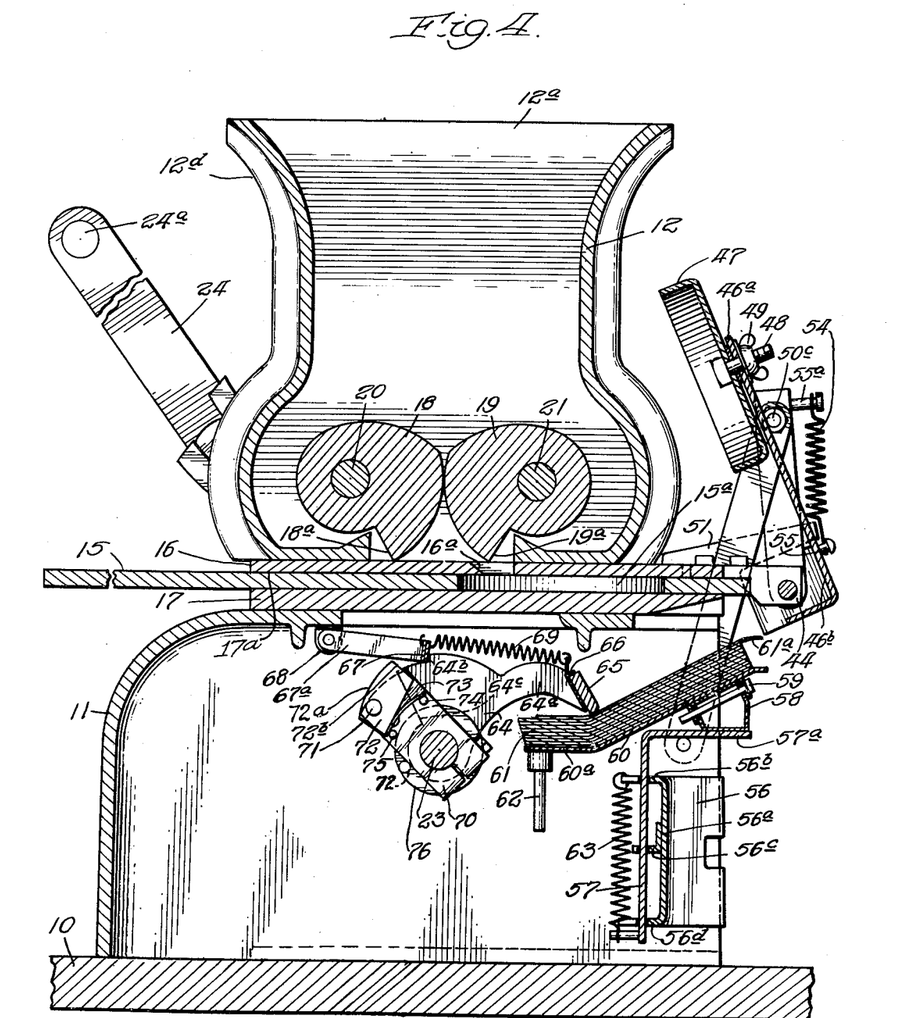
Figure 4 is a section through the apparatus taken substantially along line 4—4 of Figure 2.
Figure 7:
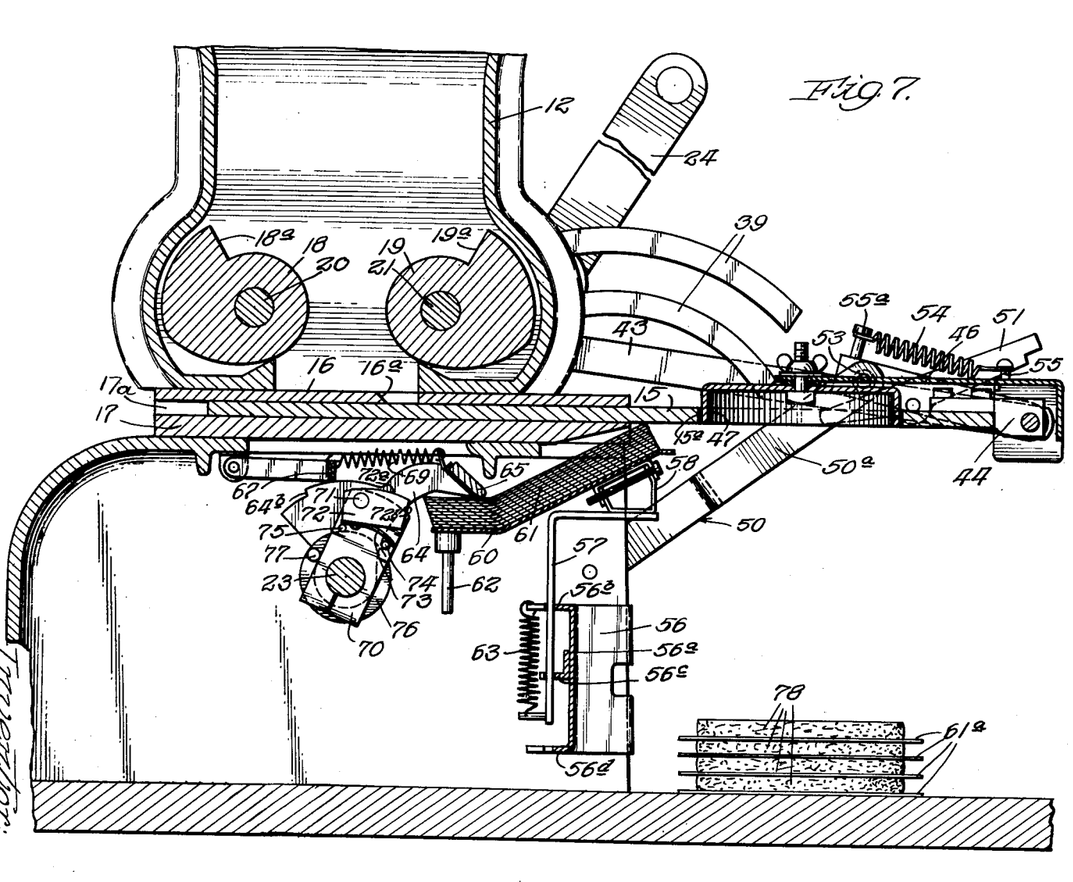
Figure 7 is a view similar to Figure 4 but showing the mold plate in extended position.
Figure 9:
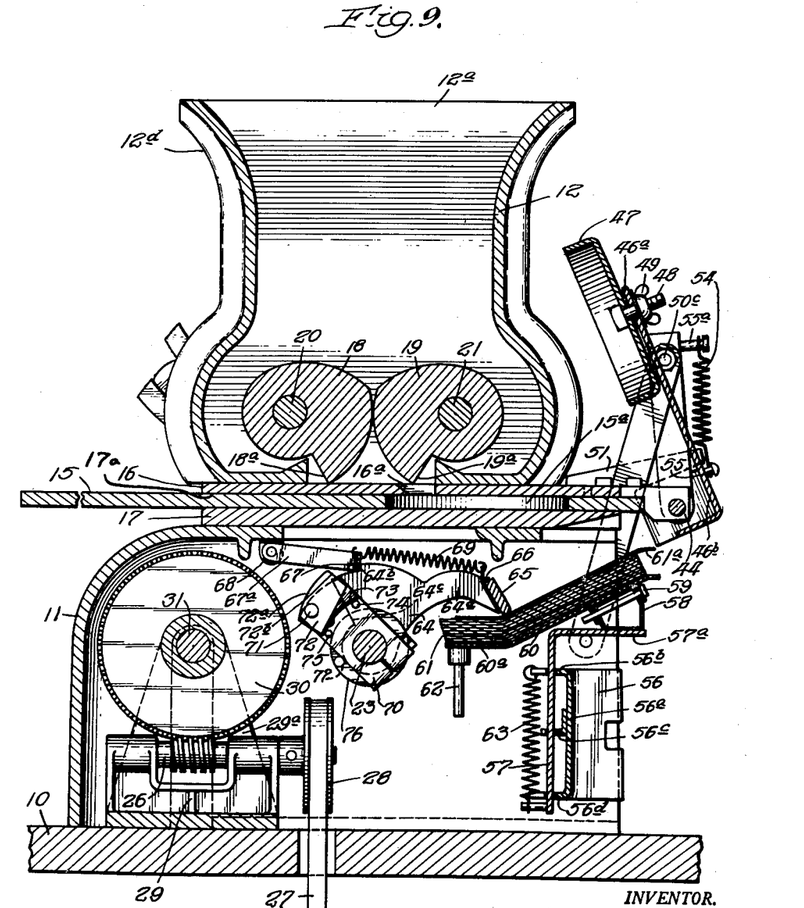
Figure 9 is a view similar to Figure 4 but also illustrating this second embodiment of the invention.

In order to feed material from the hopper 12 through the opening 16a into the mold opening 15a, there is provided a pair of oscillatable feeders 18 and 19 mounted for oscillation on shafts 20 and 21, respectively. The feeder 18 is provided with a ram portion 18a and the feeder 19 is provided with a similar ram portion 19a. As can be seen in Figures 4, 7 and 9, these ram portions are extended parts of the periphery of the feeders so as to provide a step construction. When the feeders are in the position shown in Figure 7 with the ram portions 18a and 19a furthest from the exit opening 16a, the feeders are in position preparatory to forcing material through this exit opening. When the feeders have been rotated from the positions shown in Figure 7 to the positions shown in Figure 4, they will have exerted pressure on the material within the hopper to force an amount of material through this exit sufficient to fill the mold opening 15a. The construction and operation of such a feeding arrangement is described more fully and claimed in my prior Patent 2,530,061 dated November 14, 1950.

In order to operate the molding device of this invention, there is provided a lever 22 that is attached to a shaft 23 for oscillating this shaft. The shaft 23 extends through the front side of the casing 11. In the embodiment shown in Figures 1 to 7, inclusive, this lever 22 has mounted thereon a hand lever 24 provided with a hand grip 24a for oscillating the lever 22 and thereby operating the molding device.

Figure 8:
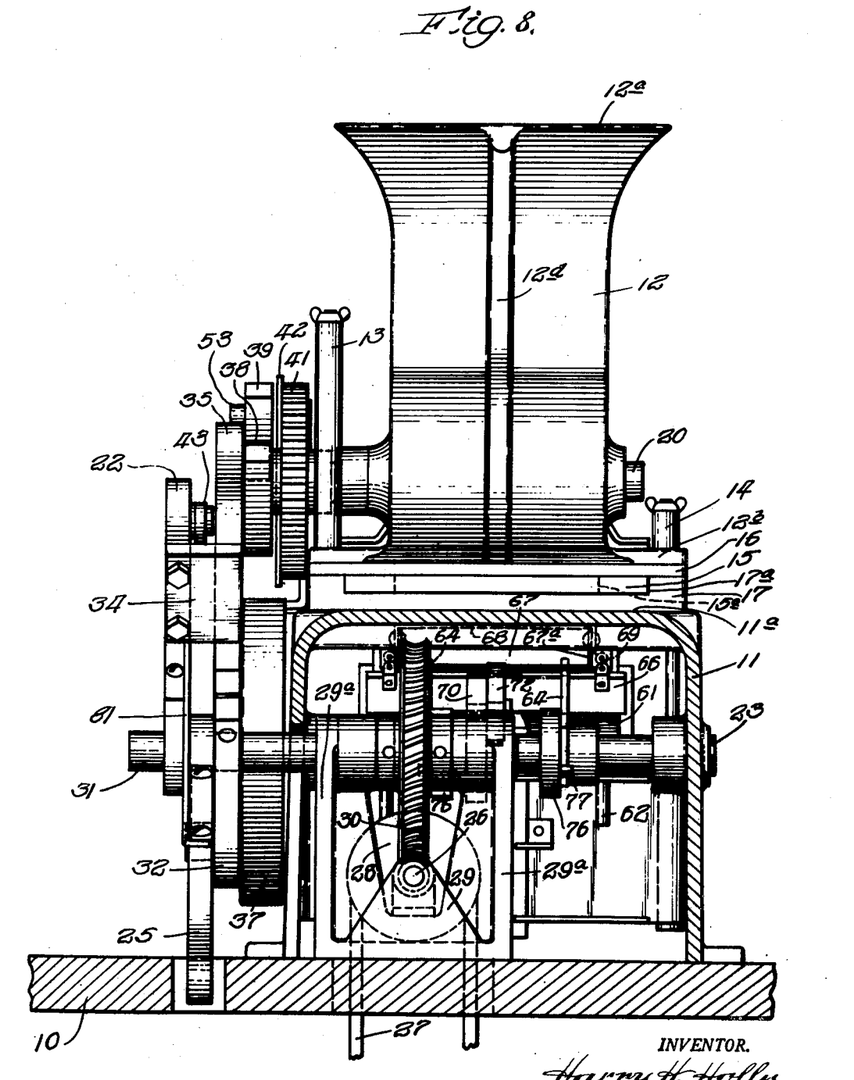
Figure 8 is a view similar to Figure 3 but illustrating a second embodiment of the invention.

In the embodiment illustrated in Figures 8 and 9 there is shown gearing and other connections for power driving the device of the invention. The power driven portion of the apparatus in the accompanying Figures 8 and 9 includes an electric motor (not shown) preferably located beneath the base 10 and driving a worm 26 through a belt 27 that passes over a pulley 28 mounted on the end of the worm 26. This worm which is held in a mounting 29 drivingly engages a worm gear 30 so that the worm and worm gear combination acts as a speed reducer. The worm gear is mounted on a shaft 31 which is rotatably held in an extension 29a of the mounting 29. As can be seen, rotation of the worm 26 drives the worm gear 30 which in turn drives the shaft 31. This shaft 31 rotates a linkage 32 which carries on its outer end a pin 33 engaging a longitudinal slot 25a in the extension 25. The slot is curved at 25b in order that the apparatus will pause in its movements momentarily at each end of an operational cycle.

Figure 1:
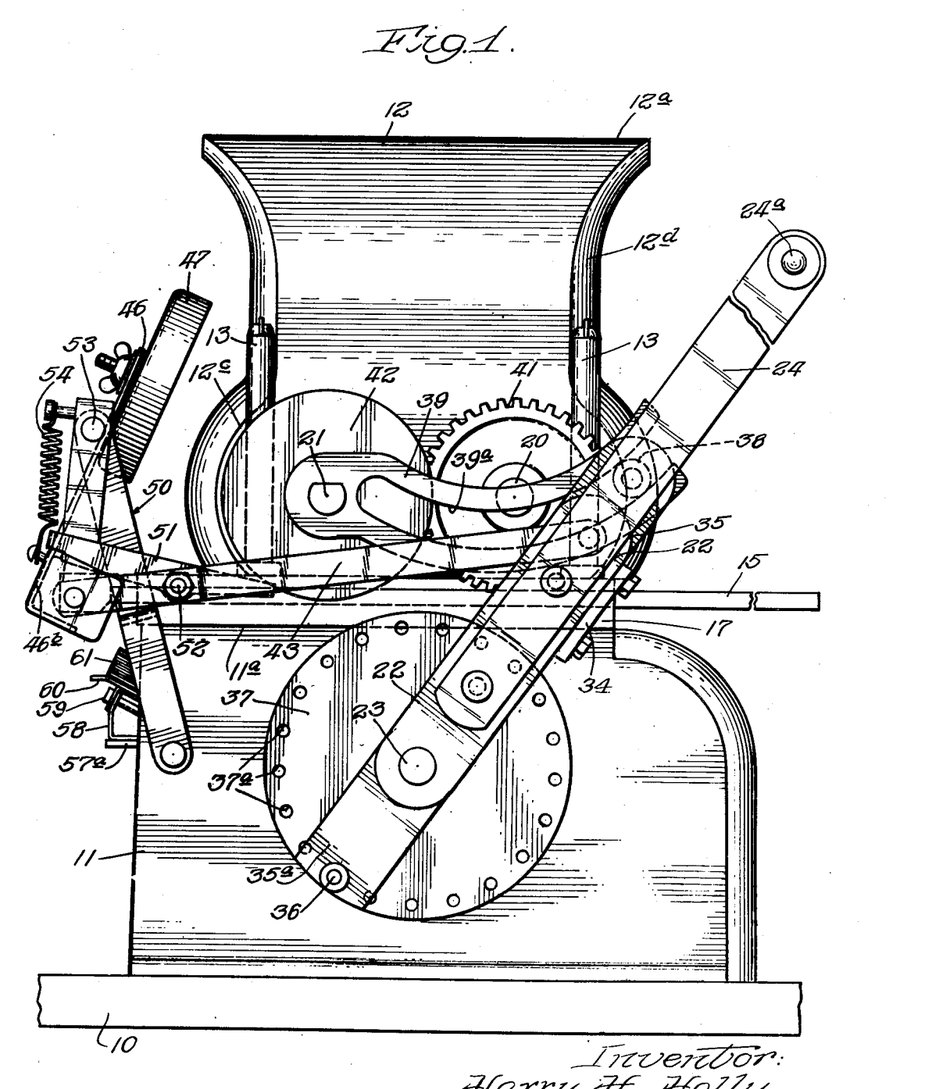
Figure 1 is a side elevation of a molding apparatus embodying this invention with the mold plate in substantially fully retracted position.
Figure 2:
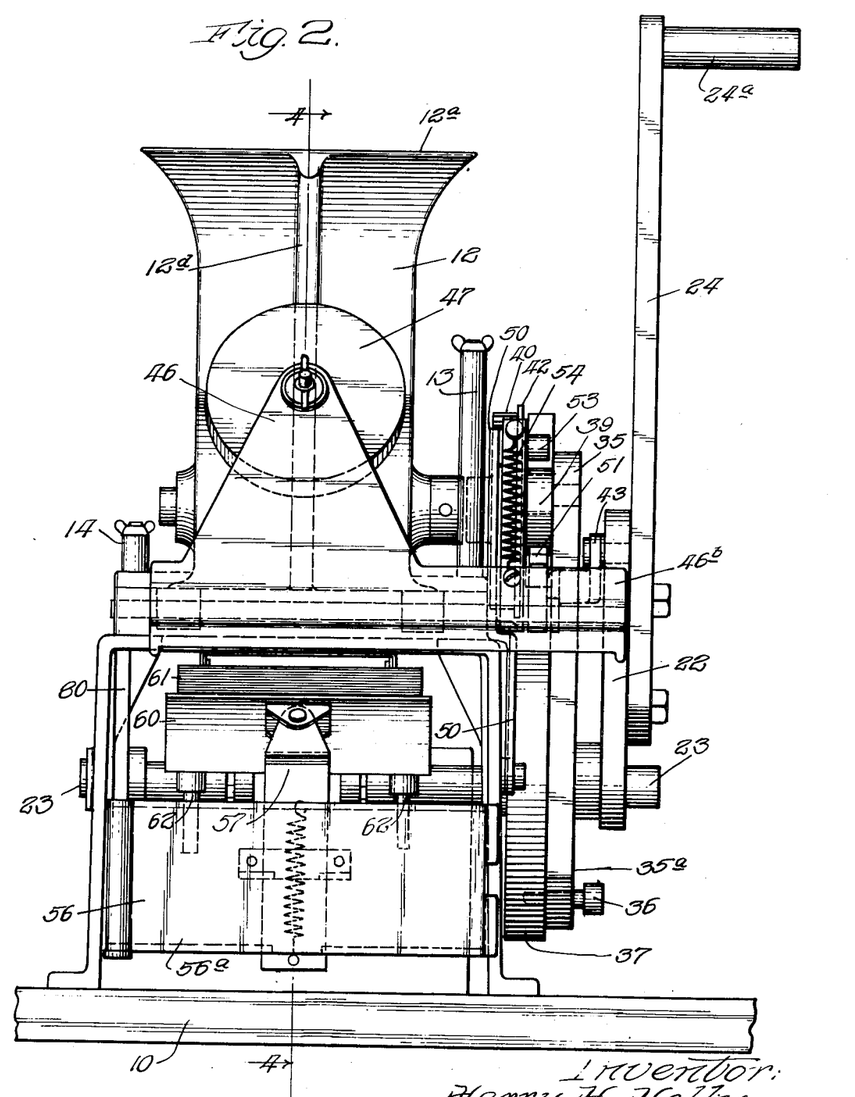
Figure 2 is an end elevation of the device of Figure 1 taken from the left hand end thereof.
Figure 3:
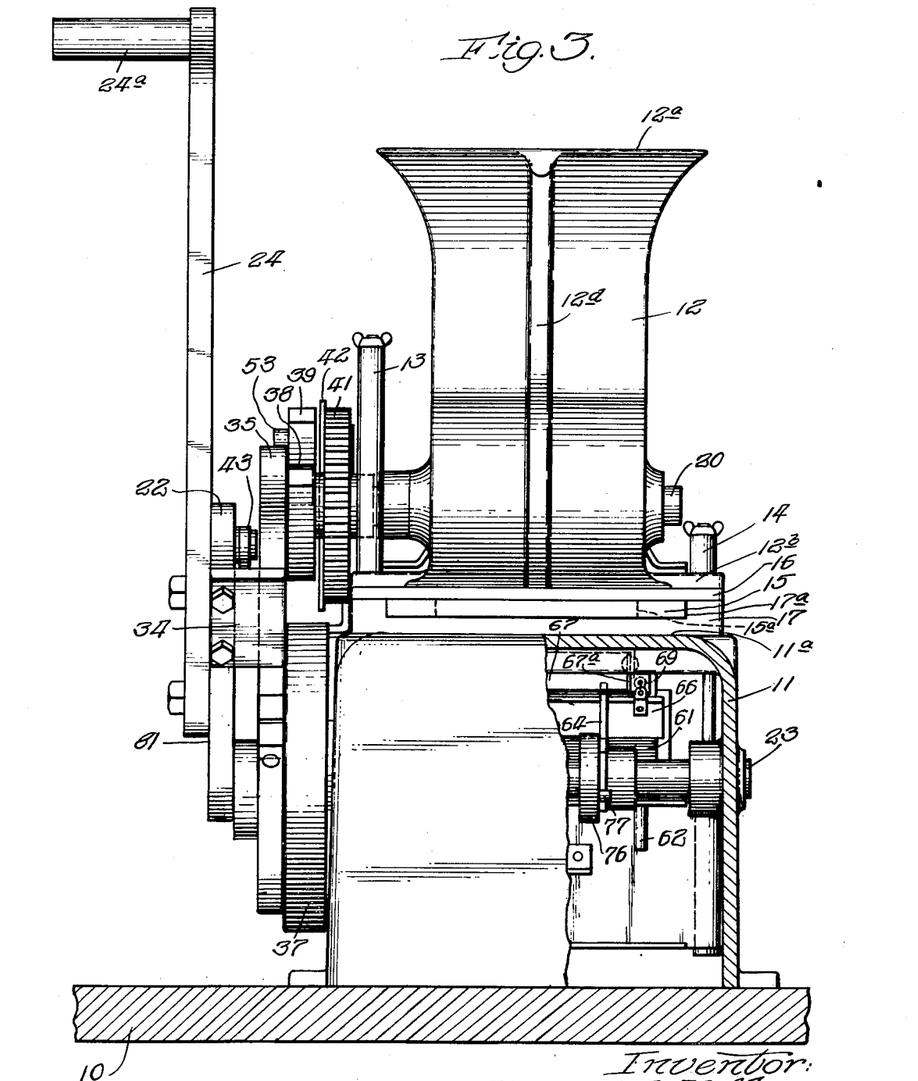
Figure 3 is an end elevation of the right hand end of the device of Figure 1 with portions of the lower casing broken away for clarity of illustration.
Figure 5:
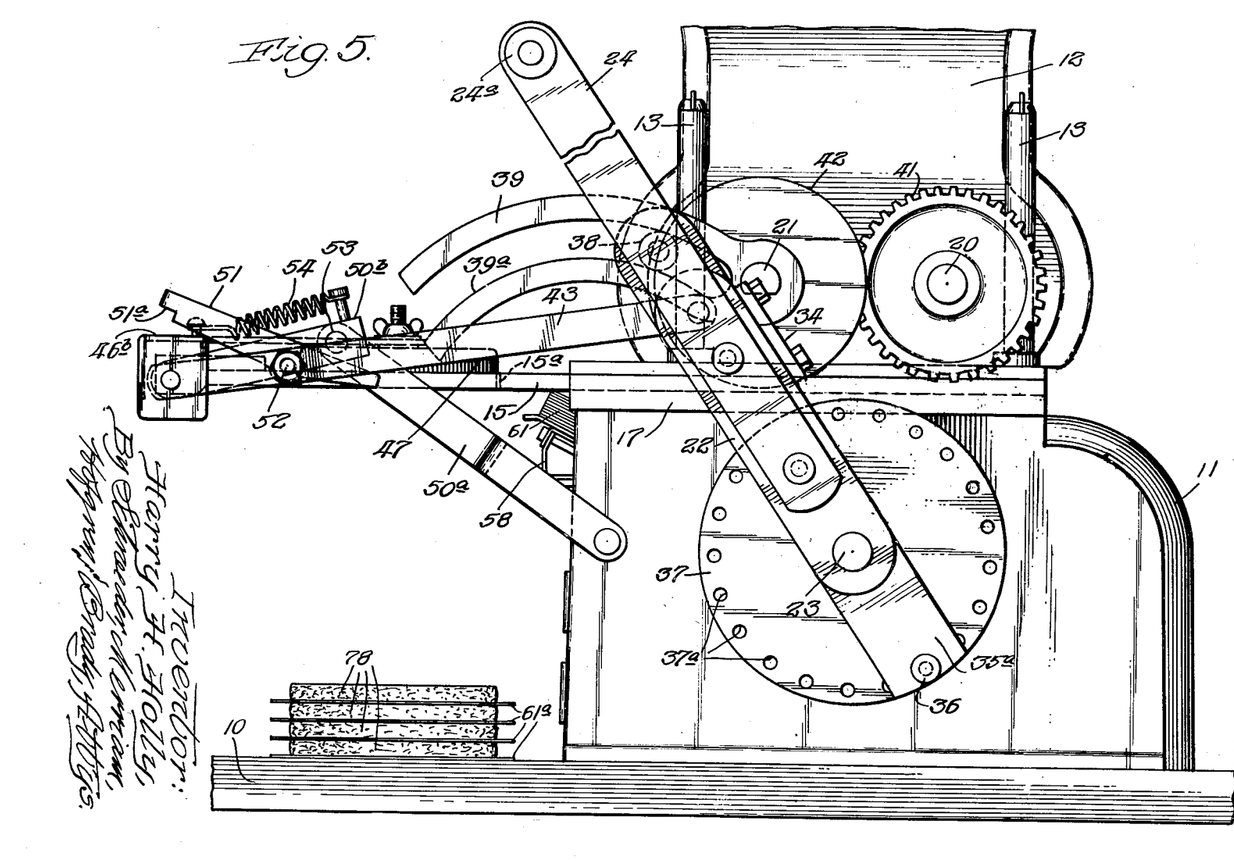
Figure 5 is a side elevation similar to Figure 1 except showing the mold plate in extended position.

From the above description, it is obvious that the lever 22 may be oscillated back and forth between the positions shown in Figures 1 and 5, for example, either by oscillating the hand lever 24 as illustrated in Figures 1 to 7 or by rotating the linkage 32 by means of an electric motor or other power source as illustrated in the embodiment shown in Figures 8 and 9. In order to simplify the description, the apparatus will be further described in construction and operation as if it were hand operated although the motor operation could of course be used as described above.

Attached to the right hand edge of the lever 22, as viewed in Figure 1, is a small bracket plate 34 which is adapted to extend beyond the edge of a movable member 35. This member 35 and the lever 22 are normally in superposed relationship with the member 35 rotatably mounted with respect to the shaft 23. The lower end 35a of the member 35 is provided with a removable pin 36 normally held in a hole in this lower end 35a.

Between the member 35 and the adjacent side of the lower casing 11, there is provided a flat substantially cylindrical casing 37 for a coiled spring (not shown). This spring is an ordinary flat steel spring coiled upon itself and housed within this casing 37. The outer end of this coil spring is attached to the casing 37 while the inner end of the spring is operably attached to the shaft 23. The spring casing 37 is rotatable on shaft 23 and is provided with spaced circularly arranged holes 37a. These holes are provided so that the tension of the spring may be predetermined by engaging the removable pin 36 on the lower end of the movable member 35 with any hole desired. The spring and casing 37 are so arranged that the stress in the spring holds the member 35 against the bracket plate 34 with a predetermined force equivalent to the predetermined stress in the spring. It is, therefore, apparent that the pin 36 holds member 35 and casing 37 for rotation on shaft 23 as a unit and that increased stress may be placed in the spring by locating the pin 36 in succeeding holes 37a.

The upper end of the movable member 35 is provided with a cam follower 38 engaging the curved cam track 39a in an arcuately curved feeder actuating lever 39. The feeder actuating lever 39 has one end attached to the feeder shaft 21 for rotation therewith. This feeder shaft is provided with a circular gear 40 which engages a second circular gear 41 on the other feeder shaft 20. The first circular gear 40 is held in place by the feeder actuating lever 39 being fastened to the shaft 21. The second gear 41 and thus the shaft 20 and feeder 19 are held in place by a disc 42 on the shaft 21 and overlapping the second gear 41. This construction greatly simplifies the mounting of the gears, shafts and feeders and makes it much easier to disassemble the machine for cleaning purposes.

As can be seen in Figures 1 and 4 where the apparatus is arranged with the mold plate 15 in completely retracted position and the feeders 18 and 19 in the position shown, the hand lever 24 is to the right (Fig. 1) and the cam follower 38 is adjacent to the outer end of the cam track 39a of the feeder actuating lever 39. This cam track is curved downwardly when the apparatus is in this position and movement of the hand lever 24 to the left (Fig. 1) or toward the position shown in Figure 5 causes the mold plate 15 to move to the left, the spring casing 37 and lever 35 to be rotated in a counterclockwise direction, and the feeder actuating lever 39 also to be rotated in a counterclockwise position toward the position shown in Figure 5. This rotation of the lever 39 causes the feeders to move from the positions shown in Figure 4 toward the positions shown in Figure 7 where the ram portions 18a and 19a are furthest from the hopper exit opening 16a. Movement of the hand lever 24 in the opposite direction tends to move the bracket plate 34 from its abutting relationship with the edge of the movable member 35. However, the stressed spring in casing 37 holds the member 35 against this plate 34, at least initially, to cause the cam follower 38 to rotate the feeder actuating lever 39 in a clockwise direction from the position shown in Figure 5 toward the position shown in Figure 1. This rotation of the feeder lever 39 rotates the feeders from the positions shown in Figure 7 toward the positions shown in Figure 4 to force plastic material through the hopper exit 16a. Oscillation of the lever 22 is also used to reciprocate the mold plate 15. This is accompanied by providing a linkage member 43 having one end rotatably attached to the upper end of the lever 22 and the opposite end rotatably attached to the outer end of the mold plate 15.

This outer end of the mold plate 15 is provided with a pair of brackets 44 at the edges thereof and extending beyond this end. Extending between the outer ends of these brackets is an axle 45 that is rotatably engaged by the linkage member 43 to reciprocate the mold plate 15. Rotatably mounted on this axle 45 is a holder 46 for a knock-out ring 47 adapted to enter the mold opening 15a and remove material therefrom. This holder 46 which is rotatably mounted on the axle 45 is provided with an extended portion 46a extending toward the hopper 12 with the innermost end of this portion adapted to have the knock-out member 47 removably attached thereto as by the bolt 48 and winged nut 49. The opposite end of the member 46 which is mounted on the axle 45 is provided with an outwardly extending flange portion 46b.

In order to raise the removing member or knock-out ring 47 to the position shown in Figures 1 and 4, there is provided a toggle joint 50. One end 50a of this toggle joint is rotatably attached to the casing 11 and the other end 50b is rotatable on the axle 45 and located immediately beneath the flange 46b of the knock-out ring holder 46. The toggle joint 50 is so arranged that movement of the mold plate 15 to its retracted position with the mold opening 15a beneath the hopper exit opening 16a raises the toggle ends 50a and 50b. This raising of the toggle end 50b also raises the knock-out ring holder 46 because of the engagement of this toggle end 50b with the flange 46b as shown most clearly in Figure 4.

In order to retain the knock-out ring 47 and its holder 46 in elevated position, there is provided a catch member 51 rotatably mounted on the linkage member 43 which moves the mold plate 15. This catch member is mounted for rotation about a bolt 52 and is so proportioned that the heavy end of the catch member is beyond this bolt resting on top of the flange 46b. The catch member 51 is provided with a cut away catch portion 51a so positioned that it drops down behind the knock-out ring holder flange 46b when this flange has reached the position shown in Figure 4 so that the holder and ring are in inoperative position and cannot fall when the mold plate starts to move in its opposite direction. With this movement the flange 46b is released by the toggle joint end 50b.

In order to disengage the catch member 51 from the flange 46b and permit the knock-out ring 47 to fall downwardly and knock the material from within the mold opening 15a, there is provided a knock-out pin 53 at the hinged connection of the toggle joint 50. This knock-out pin 53 is adapted to engage the light end of the catch member 51 beyond its pivot bolt 52 and rotate the catch member 51 in a clockwise direction as shown in Figure 5 in order that the flange 46b will be released. As soon as this flange is released, the knock-out ring holder 46 and thus the ring 47 falls forwardly so that the ring enters the opening 15a to knock molded material therefrom. The parts are so arranged that this action occurs when the mold opening has been moved from the first position illustrated in Figure 4 where it receives material from the hopper to its second position illustrated in Figure 7 where the mold material is removed from the opening.

In order to accelerate the downward movement of the knock-out ring 47 and thus give the material within the mold opening 15a a sharp rap so that the material will be removed cleanly, there is provided a helical tension spring 54 extending between a post 55 on the flange 46b and a post 55a on the toggle end 50b adjacent the toggle joint 50c. With this arrangement the movement of the toggle joint toward a position where the toggle ends are in alignment places increased tension on the spring 54. Therefore, at the moment when the catch member releases the ring holder, the spring is under its maximum tension and the knock-out ring is snapped sharply downwardly to remove the molded material from the opening 15a.

Located within the lower housing 11 is the separator sheet feed for the apparatus. These separator sheets are ordinarily sheets of thin moisture-resistant paper and are adhered to the bottom of the mold plate 15 so as to extend across the mold opening in contact with the bottom surface of the material within the opening. Ordinarily where ground meat is being molded there will be sufficient meat juices on the bottom surface of the mold plate to provide the necessary adhesion. Other adhering means may be used, however, if desired. Paper sheet arrangements of this nature are described and claimed in my U. S. Patent No. 2,684,501 dated July 27, 1954.

In the molding apparatus shown in the drawings, the forward end of the lower casing 11 is open and is provided with a vertical rod 80 adjacent and parallel to one end thereof. On this rod 80, there is rotatably mounted a plate 56 adapted to extend transversely across this open end at the bottom thereof and to be latched in place. This plate has a recessed middle portion 56a carrying rearwardly extending brackets 56b, 56c, and 56d. Extending through openings in these brackets and vertically movable therein is a metal strip 57 having a forwardly directed horizontal portion 57a at the top thereof. On top of this portion 57a is a mounting bracket 58 rotatably supporting by means of a pin 59, a forwardly and upwardly inclined platform 60 provided with a rear substantially horizontal portion 60a. This platform is adapted to support a stack of separator sheets 61 such as sheets of moisture-resistant paper. The sheets are loosely held thereon either by providing slots in the inner edge thereof engaged by loosely held pins 62 in the manner shown in my prior patents and applications such as Patents 2,530,061 and 2,530,062, each issued November 14, 1950, or by any other suitable means.

The topmost bracket 56b on the plate 56 has attached thereto a helical tension spring 63 which has its lower end attached to the bottom of the metal strip 57. The spring 63 constantly urges the metal strip 57 and thus the platform 60 and stack 61 of separator sheets upwardly toward the mold plates 15. The plate 56 is latched in the position shown but may be rotated outwardly about the rod 80 to remove the platform 60 when more sheets are to be placed thereon.

In order to remove separator sheets seriatim from the stack 61 and apply them to the bottom of the mold plate 15 across the bottom of the mold opening 15a, there is provided a friction means comprising a pair of spaced brackets 64 mounted on the oscillatable shaft 23 for rotation relative thereto. Each bracket 64 is provided with an upwardly and forwardly extending arm 64a having a friction strip 65 such as a rubber strip attached to the outer ends thereof and forming a part thereof. The strip 65 bears against the topmost sheet 61a on the stack of separator sheets 61. The strip 65 is held by a mounting strip 66 extending transversely of the members 64 and attached thereto to form a part thereof.

The brackets 64 are arranged substantially parallel to each other and adjacent to opposite edges of the stack of sheets 61. Each bracket 64 is provided with a sloped step 64b adjacent its rear edge with these steps engaging a cross bar 67 hingedly mounted by means of a pair of legs 67a to brackets 68 on the top inner surface of the lower casing 11. This cross bar 67 and legs 67a are substantially aligned with the upper edge of each bracket 64 when the cross bar 67 is in engagement with the sloped steps 64b as shown in Figure 4. In order to hold these steps against the cross bar 67 there are provided a pair of tension springs 69 extending between the cross bar 67 and the mounting strip 66 for the friction strip 65. With this construction, the counterclockwise movement of the brackets 64 as shown in Figure 4 is limited by the engagement of the steps 64b with the cross bar 67 so that the platform 60 with its stack of separator sheets 61 is retained in a position beneath and spaced from the mold plate 15 as shown in Figure 4.

Mounted on the oscillatable shaft 23 for movement therewith is a catch member 70. This catch member is locked to the shaft 23 substantially midway between the brackets 64. When the parts of the apparatus are in the positions shown in Figure 4, this catch member 70 extends upwardly and rearwardly from the shaft 23. Rotatably mounted about a pin 71 on the top of the catch member 70 is a catch piece 72 having a smoothly rounded upper surface 72a and a sharper front surface 72b. This catch piece 72 is urged upwardly by means of a leaf spring 73 attached to the bottom of the catch piece and bearing against a pin 74 on the catch member 70. Upward movement of this catch piece is limited to the position shown in Figure 4 by a second pin 75 located beyond the pivot pin 71.

Also mounted on the oscillatable shaft 23 for oscillation therewith is a pair of collars 76 with each collar being adjacent to a bracket 64. Each collar is provided with an outwardly projecting pin 77 on the annular portion thereof for engagement with a cut-away part 64c on a bracket 64.

With the construction of the separator sheet feed as described and with the mold plate in retracted position as shown in Figure 4 where the mold opening 15a is in communication with the hopper exit opening 16a, the brackets 64 are held immovable by means of the springs 69 urging the brackets 64 in a counterclockwise direction so as to hold the sloped step 64b against the cross bar 67. When the oscillatable shaft 23 is oscillated in a clockwise direction as shown in Figure 4 either by means of the hand lever 24 or by the motor as explained above, the catch member 70 is rotated in a clockwise direction as shown in Figure 4. During this rotation, the leading edge 72b of the catch piece 72 engages the bottom edge of the cross bar 67 and lifts this bar from engagement with the steps 64b. When this occurs, the springs 69 rotate the brackets 64 in a counterclockwise direction as shown in Figure 4 so that the platform 60 moves upwardly under the urging of the spring 63. This upward movement to the position shown in Figure 7 causes the extended edge portion of a topmost sheet 61a on a stack 61 to contact the bottom surface of the mold plate 15 adjacent to the leading edge of the mold opening 15a during the movement of this opening away from the position shown in Figure 4 to its second position shown in Figure 7 where the material within the opening is removed therefrom. The natural adhesiveness of the bottom surface of the plate or additional adhesive means as explained in my above mentioned copending application 185,243 is sufficient to draw this topmost sheet from the stack and extend it across the bottom of the patty within the mold opening. The upward pressure of the stack of sheets 61 against the bottom of the mold plate (Fig. 7) serves to attach the topmost sheet 61a to the bottom of the mold plate and the bottom of the patty. This action occurs when the mold opening passes over the stack. When these patties are removed, they fall onto a supporting surface in a stack with each adjacent patty separated by a sheet as is shown in Figures 5 and 7. As can be seen here, each patty 78 is uniform in thickness and is prevented from sticking to adjacent patties by these separator sheets.

With the parts in the position shown in Figure 7 where the topmost separator sheet has been adhered across the bottom of the mold opening and then the molded patty and adhered sheet removed, further movement of the shaft 23 in this same forward direction causes the collars 76 to be further rotated so that the pins 77, which now engage the cut-away parts 64c, rotate the brackets 64 in a clockwise direction. This rotation in a clockwise direction causes the friction strip 65 to move forwardly with respect to the platform 60 and stack 61 to project the leading edge of the topmost sheet 61a from the stack as shown in Figure 4. This further movement and further clockwise rotation of the brackets 64 also moves these members against the urging of the spring 69 until cross bar 67 can drop behind the sloped steps 64b to the position shown in Figure 4. This movement also causes the members 64 to press the platform 60 downwardly to the position shown in Figure 4. At this time, the oscillatable shaft 23 has been oscillated to its greatest extent in a clockwise direction. Reverse rotation in a counterclockwise direction returns the catch member 70 and collars 76 to their initial position. This return of the catch member 70 does not serve to dislodge the cross bar 67 from the steps 64b because of the hinged connection of the catch piece 72 to the catch member. When this catch piece passes beneath the cross bar 67, the catch piece 72 engages this cross bar with its sloped upper surface 72a so that the catch piece is pressed downwardly against the urging of the spring 73. As soon as this catch piece has gone beyond the cross bar, it immediately springs into the position shown in Figure 4.

With the molding apparatus in the position shown in Figures 1 and 4 and the hopper 12 full of ground meat or other moldable material and the mold opening 15a also full of moldable material, operation of the device through one cycle is as follows:

Movement of the member 22 in a counterclockwise direction as viewed in Figure 1 causes similar movement of member 35 because of the engagement of plate 34 therewith. This movement of member 35 also causes the feeder actuating lever 39 to be rotated in a counterclockwise direction because of the engagement of cam follower 38 with cam track 39a. The movement of the member 22 in a counterclockwise direction also moves the mold plate 15 from its retracted position to its extended position as shown in Figure 5. As explained above, the knock-out ring 47 and its holder 46 have already been moved to their uppermost positions and are retained in this position by the catch member 51 until the plate has approached its fully extended position. At this time the catch member 51 is moved from engagement with the holder 46 so that the ring 47 falls into the mold opening 15a and removes the patty therefrom, all as explained in greater detail above.

Figure 6:
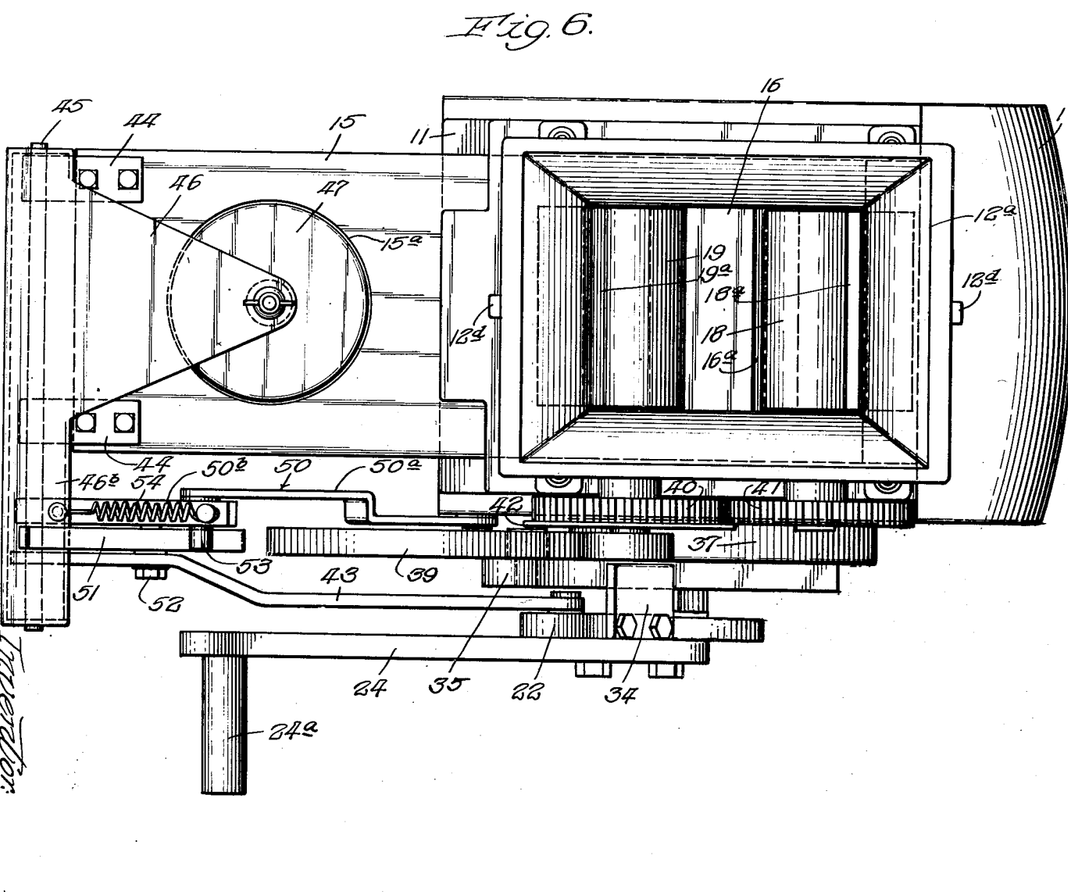
Figure 6 is a plan view of the device of Figure 5.

Movement of the oscillatable member 22 and the shaft 23 in this counterclockwise direction as viewed in Figure 1 (clockwise as viewed in Figures 4 and 7) also rotates the member 70 to release the cross bar 67 from steps 64b and permits adhering the topmost sheet 61a on the stack 61 to the bottom of the mold plate across the mold opening 15a in the manner specified above while this opening is traveling to the extended position shown in Figures 5, 6 and 7. Further movement of shaft 23 in this direction causes pins 77 to engage brackets 64 and return the platform 60 and stack of separator sheets 61 to the positions shown in Figure 4 with the bar 67 engaging the steps 64b, all as described above.

With the mold plate in fully extended position and the movable operating member 22 moved forwardly through one-half of its oscillation cycle, movement of this member in the opposite direction or from the position shown in Figure 5 to the position shown in Figure 1 moves the oscillatable member 22 and thus the bracket plate 34 rearwardly. The stress in the spring within the housing 37 holds the member 35 against the bracket 34 during at least the initial portion of this rearward movement. However, when the feeders 18 and 19 meet sufficient resistance within the hopper 12, the bracket plate 34 will move away from the spring urged member 35 leaving the full force of the spring to be exerted through the housing 37, member 35, lever 39 and axles 20 and 21 to the feeders 18 and 19. The force exerted by the feeders against this resistance within the hopper will depend upon the initial tension set up in the coil spring. As was pointed out above, this tension is regulated by the particular hole 37a in which the pin 36 is placed. Where the material to be molded is relatively fluid, this tension will be correspondingly light so that the fluid material will not be forced out the bottom of the hopper around the joints therein. Conversely when the material is relatively stiff and less fluid, the tension in spring will be correspondingly greater. It is to be understood, of course, that when the bracket plate 34 moves away from the member 35, this movement itself sets up some additional force in the spring as the inner end of the spring is attached to the axle 23.

Movement of the member 22 in this clockwise direction as shown in Figure 1 also moves the mold plate 15 from its extended to its retracted position shown in Figure 4 and simultaneously raises the knock-out ring and its holder 46 from the positions shown in Figure 7 to the elevated positions shown in Figure 4. Once again the catch member 51 drops into place to engage the flange 46b and hold the knock-out ring in elevated position. Similarly, further movement of the movable operating member 22 in the clockwise return movement (counterclockwise in Figure 7) causes the catch member 70 and collars 76 of the paper feed device to be returned to the position shown in Figure 4. As explained above, the brackets 64a have already been moved so that the steps 64b engage the cross bar 67 in the manner specified above.

One of the important features of this invention is the provision of the lever 39 or an equivalent structure for providing leverage on the feeders 18 and 19 from the spring within the housing 37. In this invention where the feeders move toward and away from the exit of the hopper 12 in order to force material therethrough, it is necessary that the feeders be withdrawn from the exit a sufficient distance to engage relatively large proportions of material for the next feeding stroke. In the embodiment shown this arcuate movement of each feeder 18 and 19 is approximately 170°. The provision of the lever 39 or equivalent structure permits this relatively wide angle of movement without requiring excess angular movement in the member 22. Furthermore, this arrangement including the lever 39 permits increasing the feeder power when such is needed at the expense of speed when speed is not necessary and increasing the speed of return of the feeders when speed is required at the expense of power when the power requirements are small. Thus, on the rearward stroke of the member 22, when it approaches the position shown in Figure 1, the cam follower 38 is moving toward the end of the lever 39. The distance between this follower 38 and the axis of axle 21 is approaching a maximum so that the leverage on this axle 21 and thus the axle 20 and the feeders 18 and 19 is of considerable magnitude. This force is needed as the feeders 18 and 19 are approaching the feeder exit 16a to force material therethrough and full power is required in order that the opening 15a in the mold plate will be completely filled and tightly packed when this opening has moved into communication with the exit opening 16a. During this portion of the cycle speed of movement of the feeders 18 and 19 is not the important factor.

When the lever 39 is being moved from the position shown in Figure 1 to the position shown in Figure 5 by a counterclockwise movement of the member 22, the lever 39 moves upwardly and forwardly rotating the axle 21 and thus the axle 20 and the feeders 18 and 19 toward the position shown in Figure 7. During this movement the cam follower 38 moves closer to the axis of axle 21 until the lever 39 is extending substantially vertically. When the follower 38 is approaching its closest position to the axle 21, the lever 39 and thus the feeders are moving at their maximum speed. This arrangement serves to return the feeders to the position shown in Figure 7 with maximum speed at the rear ends of their stroke when speed is of great advantage and this speed is achieved at the expense of power as the power requirements here are small. With this arrangement or with a similar structure the effect is one of changing to full power with relatively slow speed when this power is required to force material into the mold and the converting to high speed with less power when the mold feeders are returned to their initial position preparatory to the next power stroke.

The construction and operation of the device of this invention when power driven is exactly the same as above described for the hand driven embodiment illustrated in Figures 1 to 7. The driving mechanism for the power driven device is illustrated in Figures 8 and 9.

Having described my invention as related to the embodiments shown in the drawings, it is my intention that the invention be not limited by any of the details of description, unless otherwise specified, but rather be construed broadly within its spirit and scope as set out in the accompanying claims.

I claim:

1. In an apparatus for molding successive portions of a plastic material including a hopper for the material having a feed exit, a mold adjacent to the hopper exit communicable therewith and feeder means in the hopper movable toward and away from the feed exit to force material therethrough, apparatus comprising: a movable member forming a part of said molding apparatus; drive connecting apparatus operably connecting the feeder means and movable member for causing said movement of the feeder means on movement of the movable member; spring means forming a part of the drive connecting apparatus and capable of exerting a predetermined force on the feeder means when the feeder means is moved toward said exit; and means operably associated with the drive connecting apparatus for increasing the power exertable by said spring force when the feeder means is in a position adjacent to said exit.

2. In an apparatus for molding successive portions of a plastic material including a hopper for the material having a feed exit, a mold adjacent to the hopper exit communicable therewith and feeder means in the hopper movable toward and away from the feed exit to force material therethrough, apparatus comprising: a movable member forming a part of said molding apparatus; drive connecting apparatus operably connecting the feeder means and movable member for causing said movement of the feeder means on movement of the movable member; spring means forming a part of the drive connecting apparatus and capable of exerting a predetermined force on the feeder means when the feeder means is moved toward said exit; and means operably associated with the drive connecting apparatus for increasing the speed of movement of the feeder means when said means is in a position spaced from said exit.

3. In an apparatus for molding successive portions of a plastic material including a hopper for the material having a feed exit, a mold adjacent to the hopper exit communicable therewith and feeder means in the hopper movable toward and away from the feed exit to force material therethrough, apparatus comprising: a movable member forming a part of said molding apparatus; drive connecting apparatus operably connecting the feeder means and movable member for causing said movement of the feeder means on movement of the movable member; spring means forming a part of the drive connecting apparatus and capable of exerting a predetermined force on the feeder means when the feeder means is moved toward said exit; means operably associated with the drive connecting apparatus for increasing the power exertable by said spring force when the feeder means is in a position adjacent to said exit while decreasing the speed of movement of the feeder means; and means operably associated with the drive connecting apparatus for increasing the speed of movement of the feeder means when said feeder means is in a position spaced from said exit.

4. In an apparatus for molding successive portions of a plastic material including a hopper for the material having a feed exit and feeder means in the hopper movable toward and away from the feed exit to force material therethrough, apparatus comprising: a movable member forming a part of said molding apparatus; drive connecting apparatus operably connecting the feeder means and movable member for causing said movement of the feeder means on movement of the movable member; spring means forming a part of the drive connecting apparatus and capable of exerting a predetermined force on the feeder means when the feeder means is moved toward said exit; means operably associated with the drive connecting apparatus for increasing the power exertable by said spring force when the feeder means is in a position adjacent to said exit; a mold forming a part of said molding apparatus having a mold opening movable from a first position where the opening is in communication with the exit to receive material therethrough to a second position where the material is removed from the opening; a removing member carried by the mold to remove material from said opening; means operably associated with said mold and said movable member for substantially simultaneously moving said mold between said positions and moving the movable member to move the feeder from said exit while the mold opening is moving from said first position to the second position and urge the feeder toward said exit while the mold opening is moving from said second position to the first position; and means operably associated with said removing member for operating said removing member at said second position to remove material from said opening.

5. In an apparatus for molding successive portions of a plastic material including a hopper for the material having a feed exit, a mold adjacent to the hopper exit communicable therewith to receive material therethrough, and a feeder in the hopper movable toward and away from the exit to force material therethrough into the mold, apparatus comprising: an operating apparatus; and drive connecting means operably attached to the operating apparatus and feeder for increasing the power exerted on the feeder when the feeder is in a position adjacent to the exit.

6. In an apparatus for molding successive portions of a plastic material including a hopper for the material having a feed exit, a mold adjacent to the hopper exit communicable therewith to receive material therethrough, and a feeder in the hopper movable toward and away from the exit to force material therethrough into the mold, apparatus comprising: an operating apparatus; and drive connecting means operably attached to the operating apparatus and feeder for increasing the speed of movement of the feeder when the feeder is in a position spaced from the exit.

7. In an apparatus for molding successive portions of a plastic material including a hopper for the material having a feed exit, a mold adjacent to the hopper exit communicable therewith to receive material therethrough, and a feeder in the hopper movable toward and away from the exit to force material therethrough into the mold, apparatus comprising: an operating apparatus; and drive connecting means operably attached to the operating apparatus and feeder for increasing the power exerted on the feeder when the feeder is in a position adjacent to the exit and for increasing the speed of movement of the feeder when the feeder is in a position spaced from the exit.

References Cited in the file of this patent

UNITED STATES PATENTS

| 2,475,463 | Santo | July 5, 1949 |
| 2,530,062 | Holly | Nov. 14, 1950 |
| 2,564,064 | Holly | Aug. 14, 1951 |

FOREIGN PATENTS

| 833,866 | France | July 25, 1938 |